UNITED STATES PATENT OFFICE.

AUGUSTE VASSEUX, OF AILLY-SUR-NOYE, FRANCE.

PROCESS FOR THE MANUFACTURE OF MANURE AND ALKALI SALTS.

No. 909,350.

Specification of Letters Patent.

Patented Jan. 12, 1909.

Application filed June 4, 1907. Serial No. 377,125.

*To all whom it may concern:*

Be it known that I, AUGUSTE VASSEUX, a citizen of the Republic of France, and resident of Ailly-sur-Noye, Somme, France, have invented a new and useful Process for the Manufacture of Manure and Alkali Salts, which process is fully set forth in the following specification.

This invention relates to a process of treating by-products of sugar mills, sugar industry, distilleries, factories extracting sugar from molasses or refuse, of water from wool washing, in short of the by products containing in solution both nitrogenous organic matters and mineral matters.

The object of this invention is to recover the salts and the nitrogen. It is based on the previous rendering insoluble of the organic matters and on the subsequent lixiviation of the mass to remove therefrom the soluble salts.

The process is as follows:—First the fluid products are concentrated in any suitable evaporating apparatus, with or without addition of lime for neutralizing them. The concentration is carried to the highest possible degree of density, at least to 40 degrees Baumé. After the said concentration, two means can be used for rendering the organic matter almost completely insoluble. 1. The concentrate can be treated with a concentrated acid, for instance sulfuric acid, in the proportion of 10 to 15 per cent. by weight, which transforms it into a pasty mass, attacks the organic matters and renders them almost completely insoluble. 2. Or, if preferred, the concentrated products could be introduced, without any addition of acid, into suitable vats or kilns in which the temperature could be raised to about 180° C. and in which they are kept until sufficiently dried, that is to say, until the matter acquires the property of setting into a hard mass on cooling, which mass can then be ground. In these conditions, the pyrogenous reactions which take place during the drying, carried on slowly for about ten hours, also render the organic matters almost entirely insoluble.

After the treatment by concentrated sulfuric acid, the mass is mixed with ordinary water to which may be added, in the proportion of about 1 to 1000 extract of gall nut, cachou, dividivi, tannin, sulfate of alumina, that is to say, products capable of rendering the organic matters still less soluble. In the case of the products which were simply dried, they are mixed with water to which has been added a sufficient quantity of any acid, preferably sulfuric acid, in the proportion of about ten to fifteen per cent. of the mass, to bring about the combination with the existing bases of the preëxisting organic matters. Pyroligneous acid is also advantageous to use.

The mixing gives in the two cases a magna which is submitted to filtration in ordinary filter presses or in suction filters.

By filtration are obtained:—on the one hand, in solution, salts of potash and of soda which are separated by well known means; crystallization and concentration. On the other hand: nitrogenous organic matters which remain insoluble on the filters, in the conditions of the process, and from which water can be extracted and which can be dried.

I claim—

1. The process of manufacturing manure and alkali salts which consists in concentrating organic by-products such as described, charring to enhance the insolubility of the organic material, lixiviating, and separating the nitrogenous organic matter from the salts by filtration.

2. The process of manufacturing manure and alkali salts which consists in concentrating organic by-products such as described, charring, treating with dilute acid, and filtering.

3. The process of manufacturing manure and alkali salts which consists in concentrating organic by-products such as described, treating with a concentrated acid to enhance insolubility of the organic material, washing with a dilute acid to further enhance insolubility, and filtering.

In testimony whereof I have signed this specification in the presence of two subscribing witnesses.

AUGUSTE VASSEUX.

Witnesses:
 EMILE LEDRET,
 DEAN B. MASON.